United States Patent
Hwang et al.

(10) Patent No.: US 11,300,827 B2
(45) Date of Patent: Apr. 12, 2022

(54) BACKLIGHT UNIT INCLUDING MICRO LIGHT-EMITTING ELEMENT AND LIQUID CRYSTAL DISPLAY DEVICE

(71) Applicant: SAMSUNG ELECTRONICS CO., LTD., Suwon-si (KR)

(72) Inventors: Kyungwook Hwang, Seoul (KR); Junsik Hwang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/128,609

(22) Filed: Dec. 21, 2020

(65) Prior Publication Data

US 2021/0397045 A1 Dec. 23, 2021

(30) Foreign Application Priority Data

Jun. 19, 2020 (KR) .................. 10-2020-0074955

(51) Int. Cl.
*G02F 1/1335* (2006.01)
*G02F 1/13357* (2006.01)

(52) U.S. Cl.
CPC .. *G02F 1/133601* (2021.01); *G02F 1/133603* (2013.01); *G02F 1/133514* (2013.01)

(58) Field of Classification Search
None
See application file for complete search history.

(56) References Cited

U.S. PATENT DOCUMENTS 10,451,257 B2 10/2019 Cok
10,514,574 B2 12/2019 Cheng
2014/0132891 A1* 5/2014 Tohyama .......... G02F 1/133608
349/69

FOREIGN PATENT DOCUMENTS

KR 1020190070633 A 6/2019
KR 102064107 B1 1/2020

OTHER PUBLICATIONS

Brown, M., "What is Mini-LED backlight technology?", The Appliances Reviews, Nov. 23, 2019, 9 pages.
Silva, R., "What Is Mini LED? How it differs from standard LED and Micro LED", 2020, pp. 1-7 https://www.lifewire.com/what-is-mini-led-4769569?print.
"Understanding Today's LCD Screen Technology: How-it-works: LCD screens explained", Public Information Display, pp. 1-9, Aug. 1, 2017, https://pid.samsungdisplay.com/ko/learning-center/blog/lcd-structure.

* cited by examiner

*Primary Examiner* — Vip Patel
(74) *Attorney, Agent, or Firm* — Sughrue Mion, PLLC

(57) ABSTRACT

Provided is a backlight unit configured to emit light to a liquid crystal display device including a plurality of pixels, the backlight unit including a substrate including a driving circuit, and a light source array including a plurality of micro light-emitting elements provided on the substrate, wherein a number of micro light-emitting elements is equal to or greater than a number of the plurality of pixels.

20 Claims, 8 Drawing Sheets

BACKLIGHT UNIT INCLUDING MICRO LIGHT-EMITTING ELEMENT AND LIQUID CRYSTAL DISPLAY DEVICE

CROSS-REFERENCE TO RELATED APPLICATION

This application claims priority to Korean Patent Application No. 10-2020-0074955, filed on Jun. 19, 2020, in the Korean Intellectual Property Office, the disclosure of which is incorporated herein in its entirety by reference.

BACKGROUND

1. Field

Example embodiments of the present disclosure relate to a backlight unit including a micro light-emitting element and a liquid crystal display device.

2. Description of the Related Art

A flat panel display device is widely used not only in a mobile device, which requires minimization and low power consumption, but also in a large-sized digital TV, which requires a reduction in the weight and thickness. A liquid crystal display device is applicable to from a small-sized apparatus to a large-sized apparatus, and may be widely used.

In the liquid crystal display device, a liquid crystal panel does not self-emit light, and thus a backlight unit is provided on the rear surface of the liquid crystal panel. The light emitted from the backlight unit displays an image through a liquid crystal layer, a color filter, and the like. Accordingly, the backlight unit significantly influences the performance of the liquid crystal display device. For example, not only the screen quality such as the color reproducibility, maximum brightness, contrast ratio, white uniformity, or color temperature, but also the weight, design, lifetime, power consumption, or the like of the display device may be influenced by the backlight unit.

A light-emitting diode (LED) may be employed to a backlight unit. An LED backlight unit may be advantageous in enlargement of a display, and may reduce power consumption and an environmental issue in addition to the manufacturing cost, the weight, and the thickness of the display.

SUMMARY

One or more example embodiments provide backlight units including micro light-emitting elements.

One or more example embodiments also provide liquid crystal display devices including backlight units provided with micro light-emitting elements.

Additional aspects will be set forth in part in the description which follows and, in part, will be apparent from the description, or may be learned by practice of example embodiments of the disclosure.

According to an aspect of an example embodiment, there is provided a backlight unit configured to emit light to a liquid crystal display device including a plurality of pixels, the backlight unit including a substrate including a driving circuit, and a light source array including a plurality of micro light-emitting elements provided on the substrate, wherein a number of micro light-emitting elements is equal to or greater than a number of the plurality of pixels.

A size of each of the plurality of micro light-emitting elements may be greater than 0 and equal to or less than 100 μm.

The driving circuit may be configured to perform local dimming.

Each of the plurality of micro light-emitting elements may be driven to be turned on or turned off.

The plurality of micro light-emitting elements may be divided into a plurality of groups, and the plurality of micro light-emitting elements may be driven to be turned on or turned off based on each of the plurality of groups.

The substrate may be divided into a plurality of regions, the plurality of regions may correspond one-to-one to the plurality of pixels or may have a smaller area than the plurality of pixels, respectively, and each of the plurality of regions may include at least one micro light-emitting element among the plurality of micro light-emitting elements.

Each of the plurality of pixels may include a plurality of sub-pixels, and at least one micro light-emitting element may be provided to a region of the substrate corresponding to a sub-pixel among the plurality of sub-pixels.

Each of the plurality of micro light-emitting elements may be configured to emit blue light.

The light source array may further include at least one color conversion layer configured to convert a color of the light emitted from the plurality of micro light-emitting elements into white light.

The at least one color conversion layer may include a pattern-type color conversion layer that is divided by a partition wall or a sheet-type color conversion layer.

The plurality of micro light-emitting elements may be divided into a plurality of groups, and local dimming is controlled in units of the plurality of groups.

According to an aspect of an example embodiment, there is provided a liquid crystal display device which includes a plurality of pixels, the liquid crystal display device including a backlight unit including a substrate that includes a driving circuit, and a light source array including a plurality of micro light-emitting elements provided on the substrate, a liquid crystal panel configured to modulate light emitted from the backlight unit, and a color filter configured to filter the light modulated by the liquid crystal panel based on a color of the light modulated, wherein a number of the plurality of micro light-emitting elements is equal to or greater than a number of the plurality of pixels.

A size of each of the plurality of micro light-emitting elements may be greater than 0 and equal to or less than 100 μm.

The driving circuit may be configured to perform local dimming.

Each of the plurality of micro light-emitting elements may be driven to be turned on or turned off.

The plurality of micro light-emitting elements may be divided into a plurality of groups, and the plurality of micro light-emitting elements may be driven to be turned on or turned off based on the plurality of groups.

The substrate may be divided into a plurality of regions, the plurality of regions may correspond one-to-one to the plurality of pixels or may have a smaller area than the plurality of pixels, respectively, and each of the plurality of regions may include at least one micro light-emitting element among the plurality of micro light-emitting elements.

Each of the plurality of pixels may include a plurality of sub-pixels, and at least one micro light-emitting element among the plurality of micro light-emitting elements may be provided on a region of the substrate corresponding to a sub-pixel among the plurality of sub-pixels.

Each of the plurality of micro light-emitting elements may be configured to emit blue light.

The light source array may further include at least one color conversion layer configured to convert a color of the light emitted from the plurality of micro light-emitting elements into white light.

The at least one color conversion layer may include a pattern-type color conversion layer that is divided by a sheet-type color conversion layer or a partition wall.

The plurality of micro light-emitting elements may be divided into a plurality of groups, and local dimming is controlled in units of the plurality of groups

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
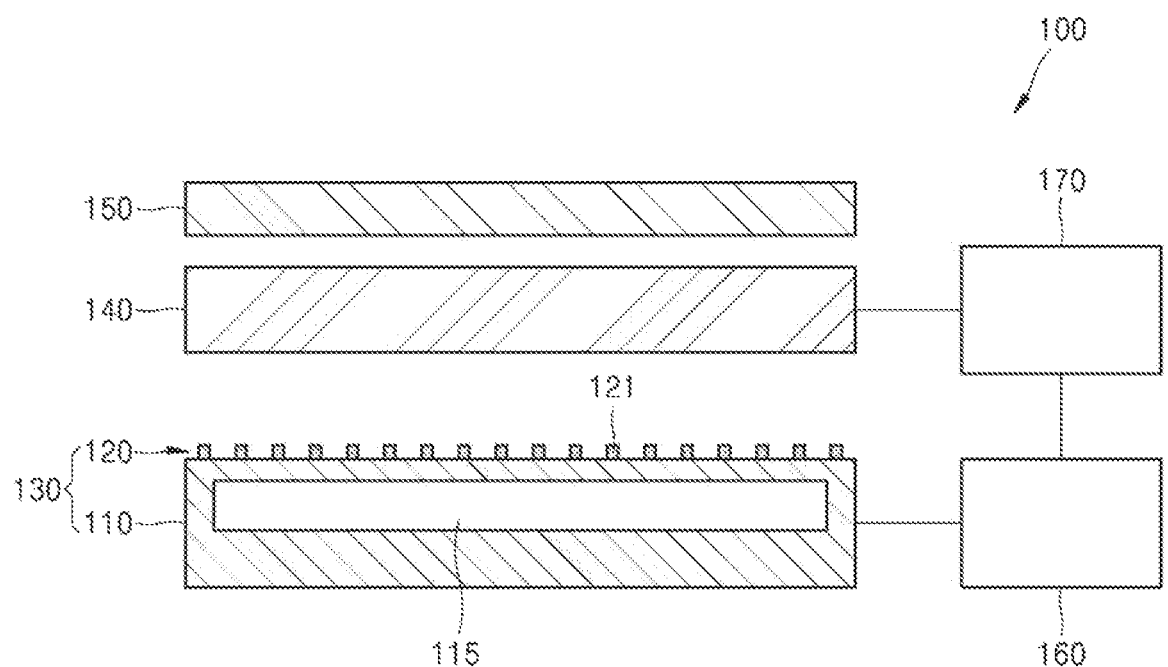
FIG. 1 schematically illustrates a liquid crystal display device according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, a backlight unit including a micro light-emitting element and a liquid crystal display device according to various example embodiments will be described in detail with the accompanying drawings. In the drawings, like reference numerals refer to like elements, and the size of each element may be exaggerated for clarity and convenience of explanation. It will be understood that, although the terms first, second, etc. may be used herein to describe various elements, these elements should not be limited by these terms. These terms are only used to distinguish one element from another.

As used herein, the singular forms "a," "an," and "the" may be intended to include the plural forms as well, unless the context clearly indicates otherwise. In addition, when an element is referred to as "comprising" or "including" a component, it does not preclude another component but may further include the other component unless the context clearly indicates otherwise. In addition, in the drawings, the size and thickness of each element may be exaggerated for clarity of explanation. It will be understood that when a prescribed material layer is referred to as being "on" a substrate or another layer, it can be directly on the substrate or the other layer, or an intervening third layer may be present. Also, materials included in layers described in the example embodiments below are only provided as examples, and other materials may be used.

The term "unit", "module" or the like means a unit configured to process at least one function or operation, and this may be implemented in hardware or software, or implemented by combining hardware and software.

The particular implementations shown and described herein are illustrative examples and are not intended to otherwise limit the scope of the present disclosure in any way. For the sake of brevity, conventional electronics, control systems, software development and other functional aspects of the systems may not be described in detail. Furthermore, the connecting lines, or connecting member shown in the various figures presented are intended to represent example functional relationships and/or physical or circuit connections between the various elements, and many alternative or additional functional relationships, physical connections or circuit connections may be present in a practical device.

The use of the terms "the" and similar referents in the context of describing the presently disclosed embodiment are to be construed to cover both the singular and the plural.

The steps of all methods described herein can be performed in any suitable order unless otherwise indicated herein or otherwise clearly contradicted by context. The use of any and all examples, or example language (e.g., "such as") provided herein, is intended merely to better illuminate the inventive concept and does not pose a limitation on the scope of the present disclosure unless otherwise claimed.

FIG. 1 schematically illustrates a liquid crystal display device according to an example embodiment.

A liquid crystal display device 100 includes a backlight unit 130 configured to emit light, a liquid crystal panel 140 configured to modulate light from the backlight unit 130, and a color filter 150 configured to filter the modulated light for each color.

The backlight unit 130 may include a substrate 110 including a driving circuit 115, and a light source array 120 in which a plurality of micro light-emitting elements 121 are arrayed on the substrate 110.

The driving circuit 115 may drive the plurality of micro light-emitting elements 121. The driving circuit 115 may include, for example, at least one transistor and at least one capacitor. The substrate 110 may include, for example, a complementary metal-oxide-semiconductor (CMOS) backplane. However, the substrate 110 is not limited thereto. For example, the substrate 110 may include a transfer substrate to which the micro light-emitting elements 121 are transferred. The micro light-emitting elements 121 may be transferred to the transfer substrate, for example, in a dry manner, or a wet manner.

A first controller 160 including at least one processor, which inputs on-off switching signals for the plurality of micro light-emitting elements 121 to the driving circuit 115, may be further provided. In addition, a second controller 170 including at least one processor, which inputs an image signal to the liquid crystal panel 140, may be further provided. The first controller 160 may be connected to the second controller 170 to synchronize the switching signals and the image signal.

Figure 2:
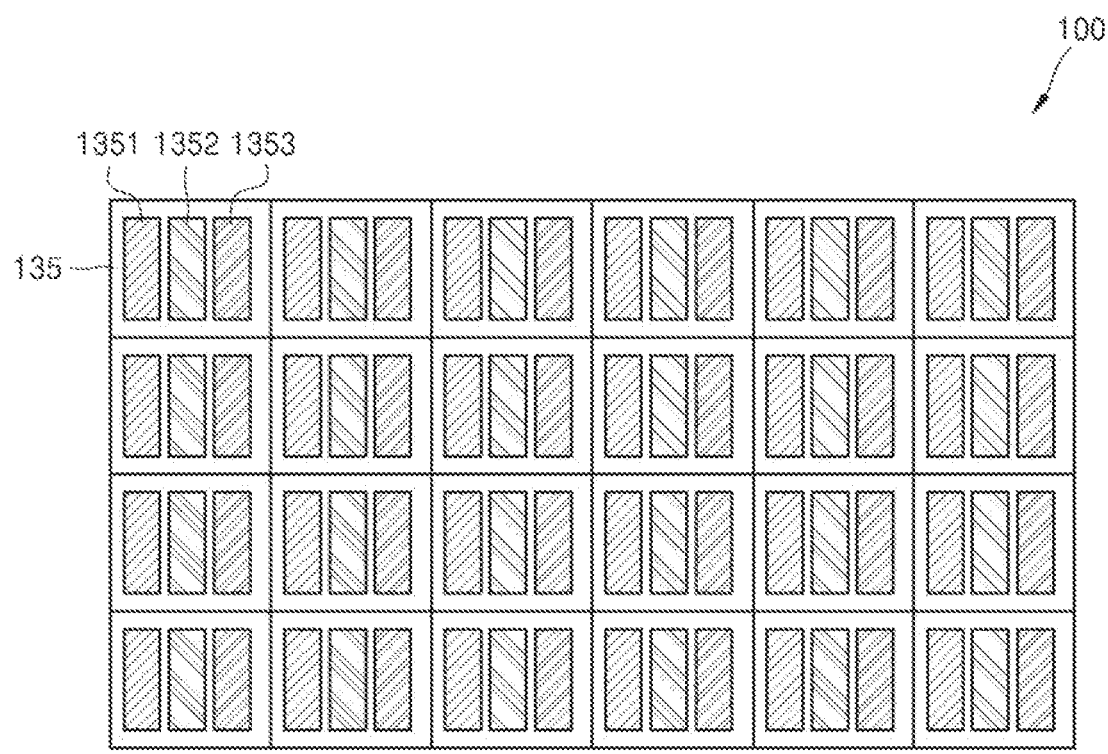
FIG. 2 is a plan view of a liquid crystal display device according to an example embodiment.

Referring to FIG. 2, the liquid crystal display device 100 may include a plurality of pixels 135. The plurality of pixels 135 may be arrayed in a two-dimensional matrix type. The pixel 135 may include a plurality of sub-pixels.

The pixel 135 may be a basic unit by which the liquid crystal display device 100 displays color. For example, one pixel 135 may include first color light, second color light, and third color light, and the color may be displayed by the first to third color light. For example, the first color light may include red light, the second color light may include green light, and the third color light may include blue light. The pixel 135 may include a plurality of sub-pixels configured to emit each color light. For example, the pixel 135 may include a first sub-pixel 1351 configured to emit first color light, a second sub-pixel configured to emit second color light, and a third sub-pixel configured to emit third color light.

The liquid crystal panel 140 may modulate light in units of pixels or units of sub-pixels according to an image signal from the second controller 170. In addition, the color filter 150 may separate light for each color for each pixel 135. An image may be formed by the liquid crystal panel 140 and the color filter 150. In FIG. 1, the liquid crystal panel 140 is illustrated as being separated from the color filer 150, but the color filter 150 may be provided inside of the liquid crystal panel 140.

Figure 3:
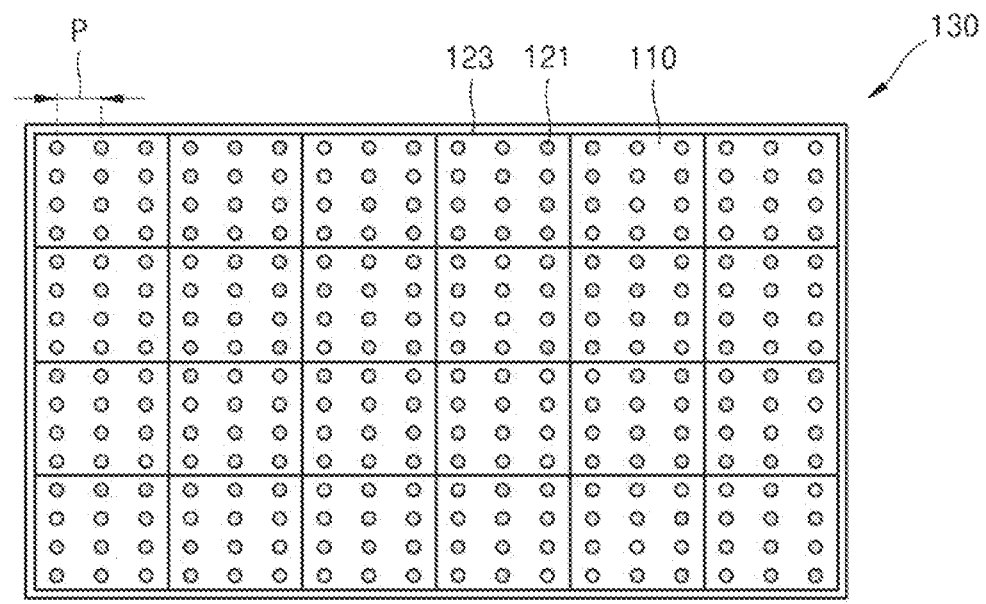
FIG. 3 is a plan view of a backlight unit according to an example embodiment.

FIG. 3 illustrates a plan view of the backlight unit 130 according to an example embodiment.

The substrate 110 is divided into a plurality of regions 123, and at least one micro light-emitting element 121 is arrayed in each of the plurality of regions 123. The plurality of regions 123 may respectively correspond to the pixels 135 or have a smaller area than the pixels 135. In addition, the number of micro light-emitting elements 121 may be equal to or greater than the number of pixels 135.

For example, 12 micro light-emitting elements 121 may be provided in each region 123. The micro light-emitting element 121 may have the size, for example, greater than 0 and equal to or less than 100 μm. The micro light-emitting element 121 may have the size, for example, greater than 0 and equal to or less than 50 μm. The micro light-emitting element 121 may have the size, for example, greater than 0 and equal to or less than 1 μm. The pitch P between neighboring micro light-emitting elements 121 may be in a range, for example, greater than 0 and equal to or less than 500 μm. However, the micro light-emitting element 121 is not limited thereto.

Figure 4:
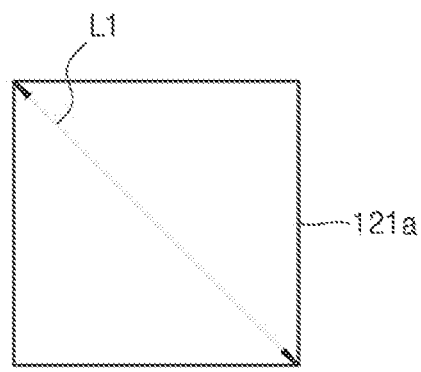
FIG. 4 illustrates a rectangular cross section of a micro light-emitting element employed in a backlight unit according to an example embodiment.
Figure 5:
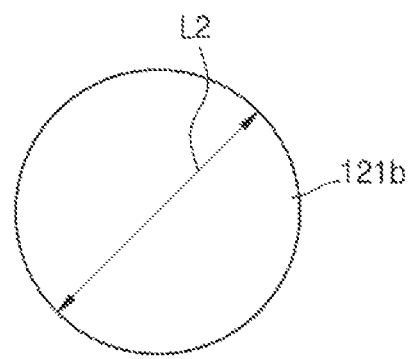
FIG. 5 illustrates a circular cross section of a micro light-emitting element employed in a backlight unit according to an example embodiment.
Figure 6:
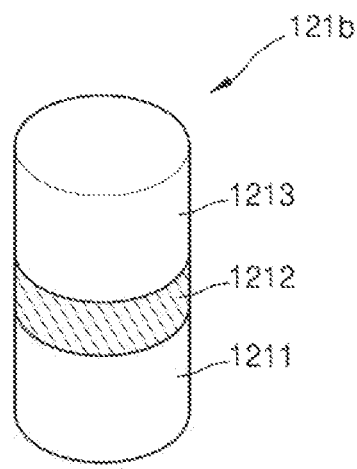
FIG. 6 illustrates a micro light-emitting element of a nano-rod type employed in a backlight unit according to an example embodiment.

Here, the size of the micro light-emitting element 121 may indicate the maximum width of the cross-section of the micro light-emitting element 121. FIG. 4 illustrates a case where a micro light-emitting element 121*a* has a rectangular cross-section. The cross-section may indicate the cross-section vertical to the direction in which the light is emitted. The width of the micro light-emitting element 121*a* may be the maximum width L1 in a diagonal direction in the rectangular cross-section of the micro light-emitting element 121*a*. FIG. 5 illustrates a case where a micro light-emitting element 121*b* has a circular cross-section. However, embodiments are not limited thereto. For example, the micro light-emitting element 121*b* may have a polygonal cross-section such as a triangular cross-section or a hexagonal cross-section. As illustrated in FIG. 6, the micro light-emitting element 121*b* may be formed in a nano-rod type, and in this case, the micro light-emitting element 121*b* may have a circular cross-section. Here, the size of the micro light-emitting element 121*b* may be the diameter of the circular cross-section. The micro light-emitting element may be of various types other than those above, and the size thereof is defined as the maximum width of the cross-section. The micro light-emitting element 121*b* of a nano-rod type may have, for example, a diameter equal to or less than 1 μm, and a height equal to or less than 5 μm.

The micro light-emitting element 121*b* may include, for example, an n-type semiconductor layer 1211, an active layer 1212, and a p-type semiconductor layer 1213. The active layer 1212 may have, for example, a multi-quantum well structure. However, the active layer 1212 is not limited thereto.

Figure 7:
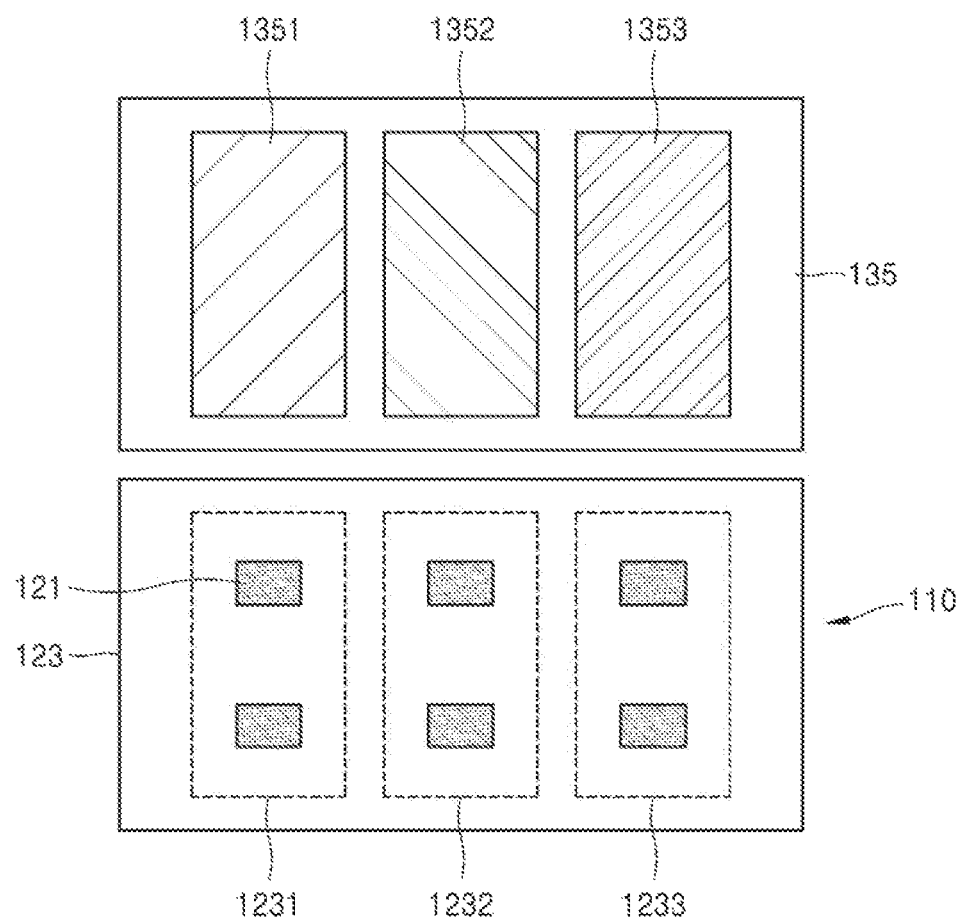
FIG. 7 illustrates an example of a micro light-emitting element array of a backlight unit according to an example embodiment.

FIG. 7 illustrates the pixel 135, and the region 123 of the substrate 110, which corresponds to the pixel 135. The pixel 135 may include a first sub-pixel 1351, a second sub-pixel 1352, and a third sub-pixel 1353.

For example, the region 123 of the substrate 110 may correspond one-to-one to the pixel 135, and a plurality of micro light-emitting elements 121 may be provided in each region 123. In FIG. 7, six micro light-emitting elements 121 are exemplarily provided in the region 123. The region 123 may include a plurality of sub-regions respectively corresponding to the sub-pixels. For example, the region 123 may include a first sub-region 1231, a second sub-region 1232, and a third sub-region 1233. Each of the first to third sub-regions 1231, 1232, and 1233 may include two micro light-emitting elements 121.

Figure 8:
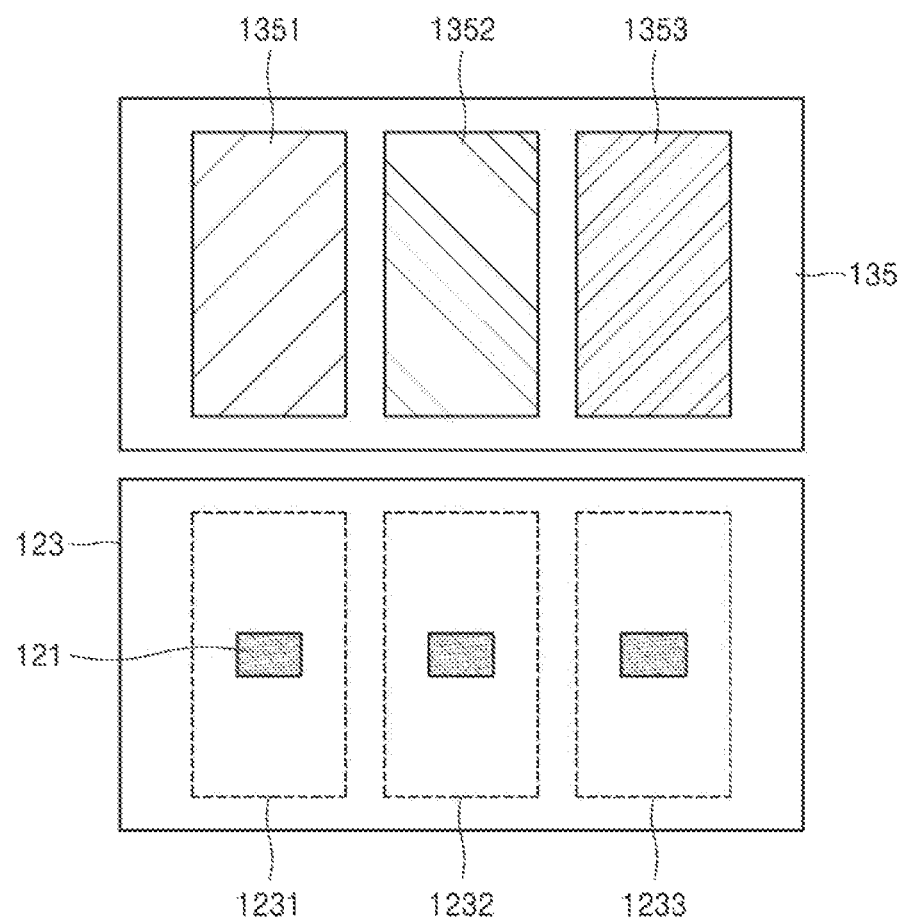
FIG. 8 is another example of a micro light-emitting element array of a backlight unit according to an example embodiment of the inventive concept.

FIG. 8 illustrates an example in which one micro light-emitting element 121 is provided in each of the first to third sub-regions 1231, 1232, and 1233. According to an example embodiment, one micro light-emitting element 121 may be provided to one region 123 corresponding to one pixel 135. In an example embodiment, the number of micro light-emitting elements 121 is equal to or greater than the number of pixels 135. The micro light-emitting elements 121 may be individually driven to be turned on or off. For example, the micro light-emitting elements 121 may be driven to be turned on or off in units of chips. Local dimming may be performed in units of chips through driving to turn on or off the micro light-emitting element 121. The micro light-emitting element 121, which corresponds to a pixel required to be black, may be turned off. In this way, local dimming is performed by controlling turning each of the micro light-emitting elements 121 off, and thus, the image quality of the liquid crystal display device may be improved. The contrast ratio may be increased by performing local dimming in units of chips.

Furthermore, the plurality of micro light-emitting elements 121 may be grouped to perform local dimming thereon. The plurality of micro light-emitting elements 121 may be divided into a plurality of groups, and driving to turn on or off the micro light-emitting elements may be controlled in units of groups. For example, in FIG. 7, the micro light-emitting elements 121 in the region 123 corresponding to the pixel 135 may be grouped, and local dimming may be performed thereon. All the micro light-emitting elements 121 in the region 123 may be driven in units of groups. For example, the micro light-emitting elements 121 in the region 123 may be driven to be turned on or off through one switching signal. In this case, the six micro light-emitting elements 121 in the region 123 may be driven by one switching element. In this way, when the local dimming is performed by grouping the micro light-emitting elements 121, the number of switching elements may be reduced and the driving circuit may be simplified. A method of grouping the micro light-emitting elements 121 may be implemented in various ways.

Figure 9:
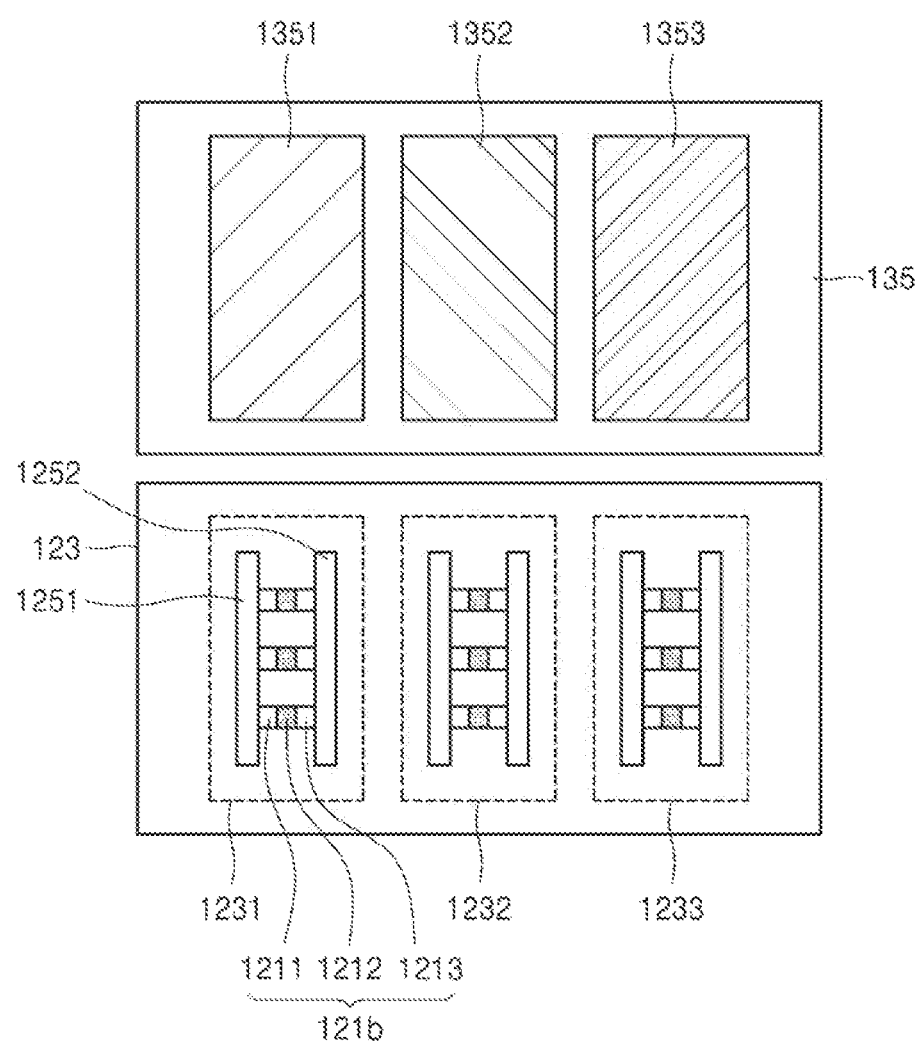
FIG. 9 illustrates an example of a nano-rod micro light-emitting element array of a backlight unit according to an example embodiment.

FIG. 9 illustrates an example in which at least one micro light-emitting element 121b of a nano-rod type is provided to the first to third sub-regions 1231, 1232, and 1233 according to an example embodiment.

An n-type electrode 1251 and a p-type electrode 1252 are separately provided to each of the first to third sub-pixels 1231, 1232, and 1233. The micro light-emitting elements 121b of a nano-rod type may be provided between the n-type electrode 1251 and the p-type electrode 1252 in a horizontal direction. The n-type semiconductor layer 1211 may be combined to the n-type electrode 1251, and the p-type semiconductor layer 1213 may be combined to the p-type electrode 1252, and the active layer 1212 may be provided between the n-type semiconductor layer 1211 and the p-type semiconductor layer 1213.

Figure 10:
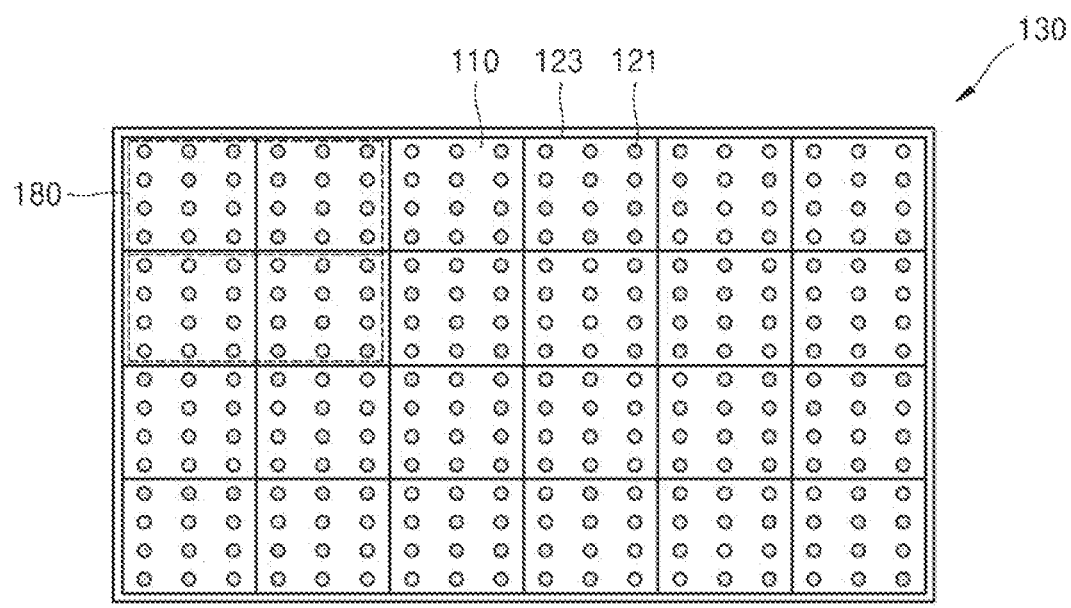
FIG. 10 illustrates grouping of micro light-emitting elements in a backlight unit according to an example embodiment.

FIG. 10 illustrates a grouping example for the local dimming according to an example embodiment.

Referring to FIG. 10, the plurality of regions 123 respectively corresponding to the pixels may be provided on the substrate 110. At least one micro light-emitting element 121 may be provided in each of the plurality of regions 123. In FIG. 10, a grouping area 180 may include two regions 123. The micro light-emitting elements 121 in the grouping area 180 may be driven to be turned on or off together with each other, and local dimming may be controlled in units of grouping areas 180. The size of the grouping area 180 may be selected according to a desired contrast ratio. For example, as necessary, the grouping area 180 may include three or four regions 123. The driving circuit may be varied according to the grouping area 180.

Figure 11:
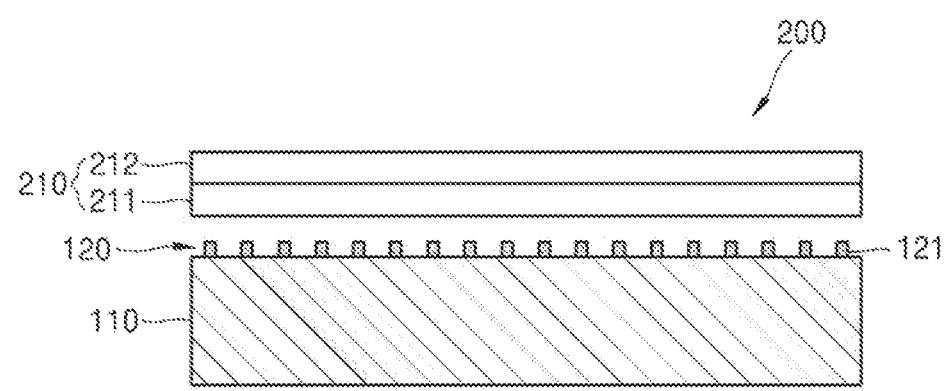
FIG. 11 schematically illustrates a backlight unit according to another example embodiment.

FIG. 11 illustrates a backlight unit according to another example embodiment.

A backlight unit 200 in FIG. 11 shows an example in which a color conversion layer 210 is further provided in the backlight unit 130 shown in FIG. 1. The color conversion layer 210 may include at least one sheet-type color conversion layer.

The color conversion layer 210 may convert the color of the light emitted from the light source array 120. The micro light-emitting element 121 may emit first color light, for example, blue light. The color conversion layer 210 may include a first color conversion layer 211 for converting the blue light from the micro light-emitting element 121 into second color light, and a second color conversion layer 212 for converting the blue light into third color light. The first color conversion layer 211 may be laminated on the second color conversion layer 212. The second color light may be, for example, green light, and the third color light may be, for example, red light.

The second color conversion layer 211 may emit green light based on blue light emitted from the micro light-emitting element 121. The second color conversion layer 211 may include quantum dots of a predetermined size, which are excited by the blue light to emit green light. The quantum dot may have a core-shell structure with a core part and a shell part, or a particle structure without a shell. The core-shell structure may have a single shell or a multi-shell. The multi-shell may be, for example, a double shell.

The quantum dot may include, for example, at least one among a II-VI group-based semiconductor, a III-V group-based semiconductor, a IV-VI group-based semiconductor, a IV group-based semiconductor, and a graphene quantum dot. The quantum dot may include, for example, at least one among cadmium (Cd), selenium (Se), zinc (Zn), sulfur (S), and indium phosphide (InP), but is not limited thereto. Each quantum dot may have a diameter equal to or less than tens of nms, for example, equal to or less than about 10 nm.

The first color conversion layer 211 may include a phosphor excited by the blue light emitted from the micro light-emitting element 121 to emit green light.

The second color conversion layer 212 may change the blue light emitted from the micro light-emitting element 121 to red light to emit the red light. The second color conversion layer 212 may include quantum dots of a predetermined size, which are excited by the blue light to emit the red light. The second color conversion layer 211 may include a phosphor excited by the blue light emitted from the micro light-emitting element 121 to emit the red light.

FIG. 11 illustrates the structure in which the first color conversion layer 211 is laminated on the second color conversion layer 212, but the first color conversion layer 211 and the second color conversion layer 212 may be formed to be one layer. For example, one layer may form the color conversion layer by including a first quantum dot for converting blue light into green light and a second quantum dot for converting the blue light into red light.

The light emitted from the light source array 120 may be emitted as white light through the color conversion layer 210. Thus, the backlight unit 200 may provide the white light to the liquid crystal panel 140 in FIG. 1. The light modulated by the liquid crystal panel 140 may be filtered for each color by the color filter 150 to form an image. An image signal may be input from the second controller 170 to the liquid crystal panel 140, and a switching signal synchronized with the image signal may be output from the first controller 160 to the driving circuit 115. The switching signal may include a local dimming signal. In the liquid crystal display device according to the example embodiment, local dimming may be performed even in a region equal to or less than the size of the pixel. Therefore, the contrast ratio of the image may be increased.

Figure 12:
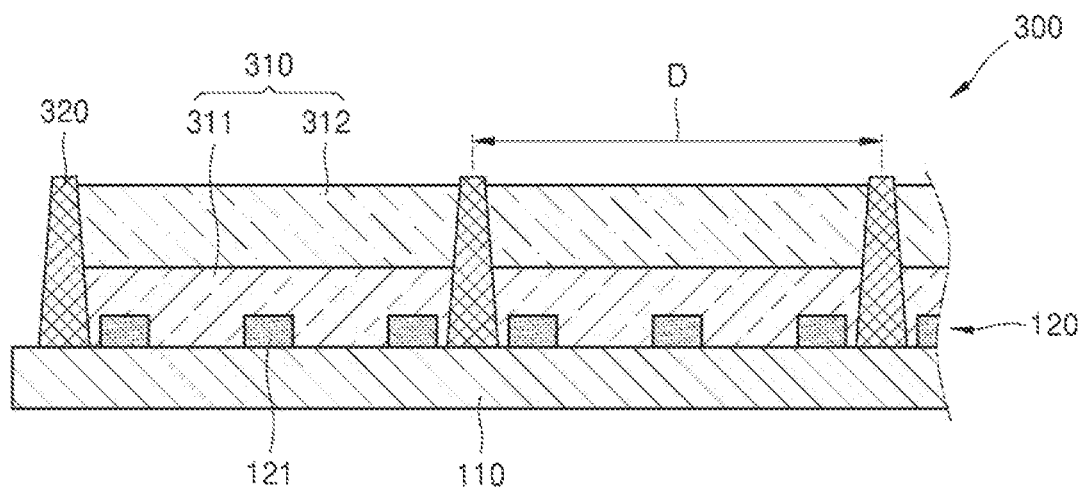
FIG. 12 schematically illustrates a backlight unit according to another example embodiment.

FIG. 12 schematically illustrates a backlight unit according to another example embodiment.

A backlight unit 300 may include a substrate 110, and a light source array 120 in which a plurality of micro light-emitting elements 121 are arrayed on the substrate 110. Partition walls 320 spaced apart at a predetermined interval may be provided on the substrate 110. At least one color conversion layer 310 may be provided between the partition walls 320. In this way, the color conversion layer 310 may include a pattern-type color conversion layer divided by the partition walls 320.

At least one color conversion layer 310 may include, for example, a first color conversion layer 311 and a second color conversion layer 312. The configurations of the first color conversion layer 311 and the second color conversion layer 312 are substantially the same as those described with reference to FIG. 10, and thus a detailed description thereabout will be omitted.

The partition walls 320 may play a role of supporting the at least one color conversion layer 310. The distance D between neighboring partition walls 320 may be designed in various ways. For example, the distance D between the neighboring partition walls 320 may be equal to or less than the width of the pixel. However, embodiments are not limited thereto, and the distance D may be greater than the width of the pixel.

The light emitted from the micro light-emitting elements 121 may be converted into white light through at least one color conversion layer 310.

Figure 13:
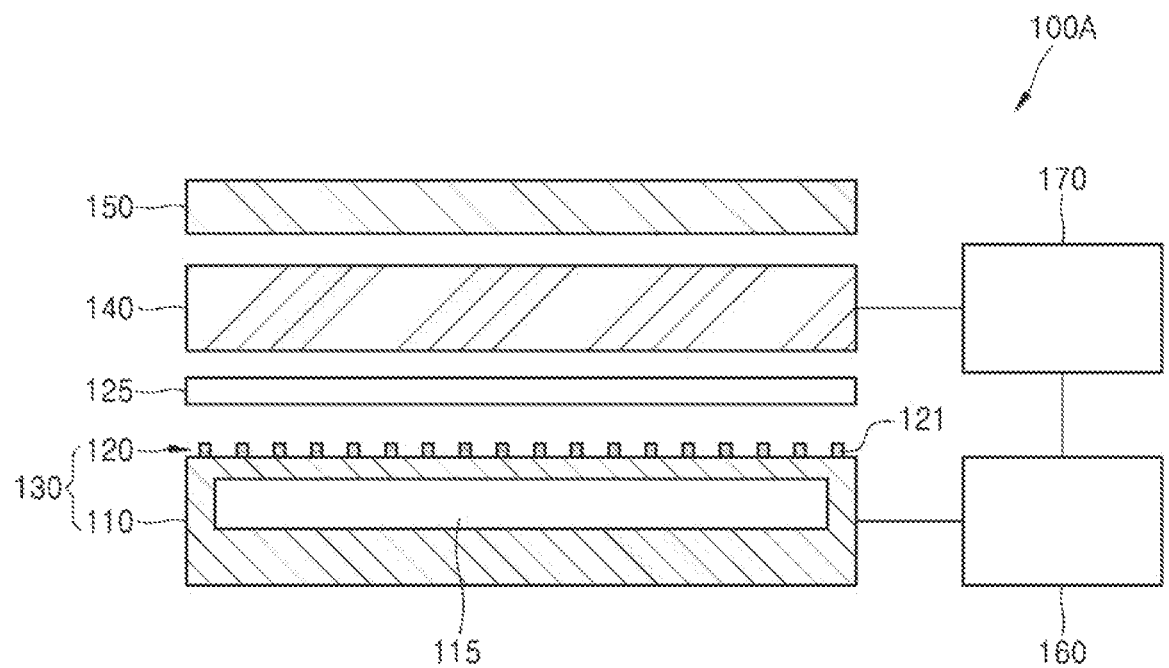
FIG. 13 schematically illustrates a liquid crystal display device according to another example embodiment.

FIG. 13 illustrates a liquid crystal display device according to another example embodiment.

When compared with the liquid crystal display device 100 illustrated in FIG. 1, a liquid crystal display device 100A may further include a diffusion layer 125.

The diffusion layer 125 may be provided between the light source array 120 and the liquid crystal panel 140. The diffusion layer 125 may diffuse the light emitted from the light source array 120 to supply uniform light to the liquid crystal panel 140. The color conversion layer described with reference to FIGS. 11 and 12 may be further provided between the light source array 120 and the liquid crystal panel 140.

The liquid crystal display device according to the example embodiment may perform, for example, local dimming in units of pixels by including a number of micro light-emitting elements equal to or greater than the number of pixels. Therefore, the contrast ratio of the liquid crystal display device may be increased.

The backlight unit according to an example embodiment may include a number of micro light emitting elements equal to or greater than the number of pixels to increase the video quality.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. A backlight unit configured to emit light to a liquid crystal display device comprising a plurality of pixels, the backlight unit comprising:
   a substrate comprising a driving circuit; and
   a light source array comprising a plurality of micro light-emitting elements provided on the substrate,
   wherein a number of micro light-emitting elements is equal to or greater than a number of the plurality of pixels,
   wherein the plurality of micro light-emitting elements are divided into a plurality of groups,
   wherein the plurality of micro light-emitting elements are driven to be turned on or turned off based on each of the plurality of groups,
   wherein each of the plurality of pixels comprises a first sub-pixel, a second sub-pixel, and a third sub-pixel, and
   wherein an n-type electrode and a p-type electrode are separately provided in each of the first sub-pixel, the second sub-pixel, and the third sub-pixel, each of the plurality of micro light-emitting elements being a nano-rod and being provided between the n-type electrode and the p-type electrode in a horizontal direction.

2. The backlight unit of claim 1, wherein a size of each of the plurality of micro light-emitting elements is greater than 0 and equal to or less than 100 μm.

3. The backlight unit of claim 1, wherein the driving circuit is configured to perform local dimming.

4. The backlight unit of claim 1, wherein each of the plurality of micro light-emitting elements is driven to be turned on or turned off.

5. The backlight unit of claim 1, wherein the substrate is divided into a plurality of regions,
   wherein the plurality of regions correspond one-to-one to the plurality of pixels or have a smaller area than the plurality of pixels, respectively, and
   wherein each of the plurality of regions comprises at least one micro light-emitting element among the plurality of micro light-emitting elements.

6. The backlight unit of claim 1, wherein each of the plurality of pixels comprises a plurality of sub-pixels, and at least one micro light-emitting element is provided to a region of the substrate corresponding to a sub-pixel among the plurality of sub-pixels.

7. The backlight unit of claim 1, wherein each of the plurality of micro light-emitting elements is configured to emit blue light.

8. The backlight unit of claim 1, wherein the light source array further comprises at least one color conversion layer configured to convert a color of the light emitted from the plurality of micro light-emitting elements into white light.

9. The backlight unit of claim 8, wherein the at least one color conversion layer comprises a patterned color conversion layer that is divided by a partition wall or a sheet color conversion layer.

10. The backlight unit of claim 1, wherein local dimming is controlled in units of the plurality of groups.

11. A liquid crystal display device which comprises a plurality of pixels, the liquid crystal display device comprising:
    a backlight unit comprising:
      a substrate that comprises a driving circuit; and
      a light source array comprising a plurality of micro light-emitting elements provided on the substrate;
    a liquid crystal panel configured to modulate light emitted from the backlight unit; and
    a color filter configured to filter the light modulated by the liquid crystal panel based on a color of the light modulated,
    wherein a number of the plurality of micro light-emitting elements is equal to or greater than a number of the plurality of pixels,
    wherein the plurality of micro light-emitting elements are divided into a plurality of groups,
    wherein the plurality of micro light-emitting elements are driven to be turned on or turned off based on each of the plurality of groups,
    wherein each of the plurality of pixels comprises a first sub-pixel, a second sub-pixel, and a third sub-pixel, and wherein an n-type electrode and a p-type electrode are separately provided in each of the first sub-pixel, the second sub-pixel, and the third sub-pixel, each of the plurality of micro light-emitting elements being a nano-rod and being provided between the n-type electrode and the p-type electrode in a horizontal direction.

12. The liquid crystal display device of claim 11, wherein a size of each of the plurality of micro light-emitting elements is greater than 0 and equal to or less than 100 μm.

13. The liquid crystal display device of claim 11, wherein the driving circuit is configured to perform local dimming.

14. The liquid crystal display device of claim 11, wherein each of the plurality of micro light-emitting elements is driven to be turned on or turned off.

15. The liquid crystal display device of claim 11, wherein the substrate is divided into a plurality of regions,
wherein the plurality of regions correspond one-to-one to the plurality of pixels or have a smaller area than the plurality of pixels, respectively, and
wherein each of the plurality of regions comprises at least one micro light-emitting element among the plurality of micro light-emitting elements.

16. The liquid crystal display device of claim 11, wherein each of the plurality of pixels comprises a plurality of sub-pixels, and at least one micro light-emitting element among the plurality of micro light-emitting elements is provided on a region of the substrate corresponding to a sub-pixel among the plurality of sub-pixels.

17. The liquid crystal display device of claim 11, wherein each of the plurality of micro light-emitting elements is configured to emit blue light.

18. The liquid crystal display device of claim 11, wherein the light source array further comprises at least one color conversion layer configured to convert a color of the light emitted from the plurality of micro light-emitting elements into white light.

19. The liquid crystal display device of claim 18, wherein the at least one color conversion layer comprises a patterned color conversion layer that is divided by a sheet color conversion layer or a partition wall.

20. The liquid crystal display device of claim 11, wherein local dimming is controlled in units of the plurality of groups.

* * * * *